United States Patent
Sun et al.

(10) Patent No.: US 12,036,674 B2
(45) Date of Patent: Jul. 16, 2024

(54) GOLDEN DATA FOR INDUSTRIAL ROBOTS

(71) Applicant: Fanuc America Corporation, Rochester Hills, MI (US)

(72) Inventors: Yi Sun, Bloomfield Hills, MI (US); Jason Tsai, Bloomfield Hills, MI (US); Sai-Kai Cheng, Rochester Hills, MI (US); Don Kijek, Waterford, MI (US); Bradley Q. Niederquell, Troy, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 966 days.

(21) Appl. No.: 16/564,848

(22) Filed: Sep. 9, 2019

(65) Prior Publication Data

US 2020/0078937 A1   Mar. 12, 2020

Related U.S. Application Data

(60) Provisional application No. 62/728,115, filed on Sep. 7, 2018.

(51) Int. Cl.
*B25J 9/16*  (2006.01)
*G05B 15/02*  (2006.01)
(Continued)

(52) U.S. Cl.
CPC .............. *B25J 9/163* (2013.01); *G05B 15/02* (2013.01); *G05B 19/0428* (2013.01);
(Continued)

(58) Field of Classification Search
None
See application file for complete search history.

(56) References Cited

U.S. PATENT DOCUMENTS

| 2013/0212420 A1* | 8/2013 | Lawson ................. H04L 67/12 713/400 |
| 2017/0223110 A1 | 8/2017 | Lawson et al. |
| 2018/0246502 A1 | 8/2018 | Meier et al. |

FOREIGN PATENT DOCUMENTS

JP        2002312007 A        10/2002

OTHER PUBLICATIONS

PCT International Search Report of the International Searching Authority dated Oct. 17, 2019 and mailed Nov. 21, 2019 for International Application No. PCT/US2019/0234827 filed Sep. 9, 2019.

* cited by examiner

*Primary Examiner* — Mohammad Ali
*Assistant Examiner* — Saad M Kabir
(74) *Attorney, Agent, or Firm* — John A. Miller; Shumaker, Loop & Kendrick LLP

(57) ABSTRACT

A method for monitoring an industrial robot. The method includes configuring the robot to perform a certain task during an integration process and storing integration data in the robot identifying the configuration of the robot for performing the task. The method also includes installing the robot in a manufacturing facility, and uploading the stored integration data to the Cloud when the robot is installed in the manufacturing facility. The method further includes capturing production data generated by the robot during operation of the robot in the manufacturing facility, uploading the production data to the Cloud, and comparing the production data to the integration data.

16 Claims, 2 Drawing Sheets

(51) Int. Cl.
*G05B 19/042* (2006.01)
*G05B 23/02* (2006.01)
*G06Q 10/06* (2023.01)
(52) U.S. Cl.
CPC ......... *G05B 23/0237* (2013.01); *G06Q 10/06* (2013.01); *G05B 2219/23026* (2013.01); *G05B 2219/23068* (2013.01); *G05B 2219/32187* (2013.01)

GOLDEN DATA FOR INDUSTRIAL ROBOTS

CROSS-REFERENCE TO RELATED APPLICATIONS

This application claims the benefit of the filing date of U.S. Provisional Patent Application 62/728,115, titled, Golden Data for Industrial Robots, filed Sep. 7, 2018.

BACKGROUND

Field

This disclosure relates generally to a method for monitoring an industrial robot that includes storing benchmark data of robot operation in the Cloud and, more particularly, to a method for monitoring an industrial robot that includes storing benchmark data of robot operation from robot integration in the Cloud, periodically uploading production data to the Cloud during robot operation and comparing the benchmark data to the production data to determine whether the production data is acceptable.

Discussion of the Related Art

Industrial robots are complex machines that are capable of performing many different functions and operations precisely and reliably. For example, robots are often employed in manufacturing facilities to perform various tasks during production of an article, such as spot welding body panels on a vehicle chassis. Entities that produce robots to perform these tasks will typically engage an integrator that programs, teaches and configures the robot to optimally perform a desired task. The information and data generated by the integrator for a particular task is sometimes referred to as golden data, golden record or golden copy, and refers to data that provides the initial quality approved based on the design criteria of mechanical components on which a software application can depend. Thus, the golden data is the reference to which a data user can turn to ensure that the correct version of a piece of information is being used.

When a robot has been configured to perform a certain task by the integration process it is then installed in a manufacturing plant to perform that task. During operation of the robot over time in the plant, the robot user may make various changes and/or adjustments to the operation of the robot because it is not performing the task optimally as a result of various things, such as temperature changes, differences in part configuration, etc. For example, the user may change the orientation of a welding head of the robot in an attempt to obtain a higher quality weld. Further, the user may wish to increase the speed of operation of the robot. As these changes to the robot are made, the performance of the robot may degrade and it may be desirable to return the configuration of the robot to its original, usually optimal, state. This situation could create a situation as to whether the robot was properly integrated before being provided to the customer or whether the customer improperly changed the configuration of the robot. However, the information required to return the robot to the original state has been lost and is usually not retrievable.

SUMMARY

The following discussion discloses and describes a method for monitoring an industrial robot. The method generally includes configuring the robot to perform a certain task during an integration process and storing integration data in the robot identifying the configuration of the robot for performing the task. The method also includes installing the robot in a manufacturing production facility, and uploading the stored integration data to the Cloud when the robot is installed in the manufacturing production facility. The method further includes capturing production data generated by the robot during operation of the robot in the manufacturing facility, uploading the production data to the Cloud, and comparing the production data to the integration data.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a method for operating an industrial robot that includes generating alerts when changes in a production data set approaches a threshold is merely exemplary in nature, and is in no way intended to limit the invention or its applications or uses.

As will be discussed in detail below, this disclosure discusses a system and method where benchmark data, sometimes referred to as golden data and integration data, not previously available in the Cloud, is collected during commissioning of a robot and uploaded to the Cloud when the robot is connected to, for example, a control system at installation of the robot in a manufacturing plant. For example, at an integration site when the robot is set up, the benchmark data generated by the user's programs is captured and stored in the robot controller during commissioning of the robot. When the robot is installed in the manufacturing plant and connected to the control system, the integration data is uploaded to the Cloud. Therefore, the user has a record of the integration benchmark data stored in the Cloud. The integration data is a snapshot of the mechanical health of the robot at the end of the integration process and includes information on estop counts, servo on time, reducer health, cable health, etc. The data set is based on user specified software programs and can contain information such as duty cycle, over-current, overheat, reducer load/life expectancy, energy consumption, incorrect payload usage, acceleration override, comprehensive motion profile data, program information, process information, etc. Production data sets are tracked and compared to the benchmark data regularly, such as on a daily basis. The control system alerts the user of data changes that approach thresholds.

Figure 1:
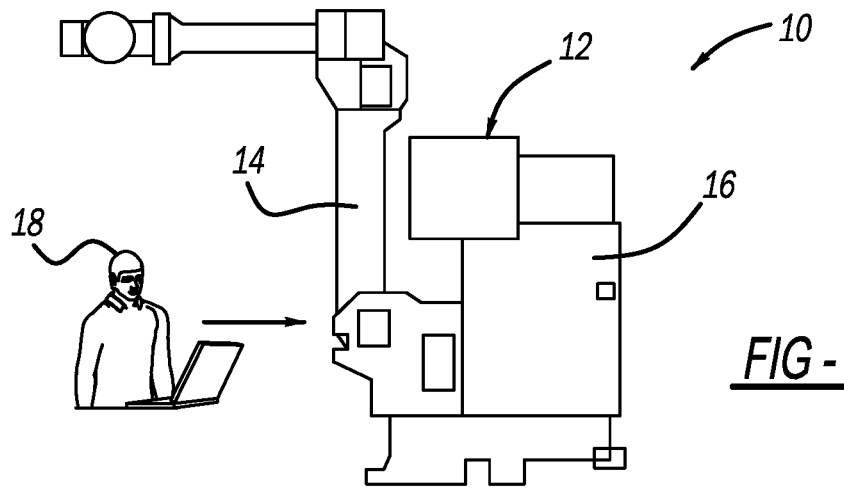
FIG. 1 is an illustration of a robot being configured at an integration site.

FIG. 1 is an illustration of an integration site 10 showing an industrial robot 12 including a robot arm 14 and a robot controller 16, where the robot 12 has been commissioned to be programmed and configured to perform a certain production task in an optimal manner by an operator or technician 18. The robot 12 is intended to represent any robot of any style and configuration that is able to perform any operation, such as painting, welding, etc., suitable and consistent with the discussion herein. The operator 18 uses any suitable technique to teach the robot 12 to perform the task, and the integration data and information that allows the robot 12 to perform that task is stored in the robot controller 16. Once the robot 12 has been configured and approved to perform the production task, it is transported to a production facility for operation.

Figure 2:
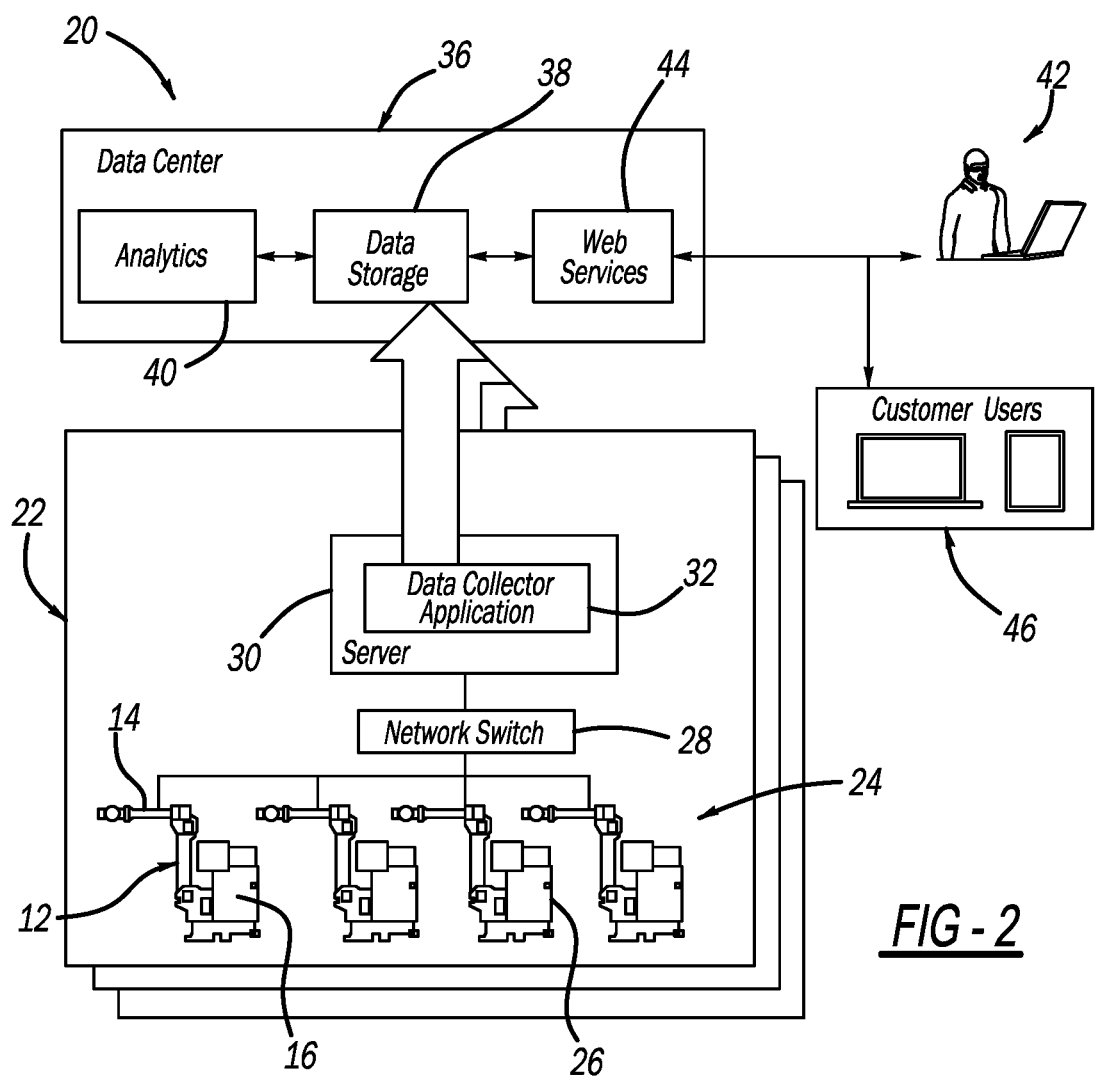
FIG. 2 is a block diagram of a robotic manufacturing or production complex including the configured robot shown in FIG. 1.

FIG. 2 is an illustration of a production or manufacturing complex 20 including a number of factories 22 intended to represent any manufacturing or production facility that uses industrial robots, where one of the factories 22 shows the robot 12 being part of a robotic assembly line 24 with other robots 26. The robots 12 and 26 are connected to some type of network interface or switch device 28 that is connected to a server 30 in one of the factories 22 that operates a data collection application 32, where the application 32 allows the server 30 to communicate with a data center 34 in the Cloud. Data and other information obtained from the robots 12 and 26 is stored in a data storage device 38 in the data center 34 and processed by an analytics processor 40 along with the data and information from other robots in all of the factories 22. The information and data stored and analyzed in the data center 36 is accessible by a data analyzer 42, such as an employee of the owner of the data center 36, through a web service 44 at the data center 36, and a user 46 at the factory 22 or otherwise is able to obtain the analyzed data including alerts for upcoming maintenance, potential unexpected downtime issues, and such.

The combination of the data collector application 32, the data center 36, the data analyzer 42 and the user 46 is referred to herein as a control system, and its operation is well understood by those skilled in the art. The control system as described collects data from the robots 26 in the factories 22 and monitors the robots 26 to identify whether abnormal wear that could lead to a failure is occurring and, if so, parts and/or support can be sent to address the issue before any downtime occurs. The control system also keeps track of robot usage and sends reminders at appropriate intervals to ensure important maintenance activities are completed on time. The control system collects data on all of the robots 26 so that the robot's health data is available, such as reducer, motor, emergency stops, energy usage, maintenance reminders, etc. It is noted that although the discussion herein refers to the control system as collecting and analyzing the data and information from the robot 12 in a certain manner, this is merely for illustrative purposes in that any suitable data collection and analysis system can be employed consistent with the discussion herein.

When the robot 12 is delivered to the factory 22 and is connected to the server 30 through the device 28, the integration or benchmark data is uploaded from the robot controller 16 to the data center 36 so that it is available later, if desired. As the robot 12 performs the task at the factory 22, the configuration and operation of the robot 12 will periodically be uploaded to the data center 36 as production data with a time stamp. Therefore, if changes are made to the configuration of the robot 12 at any time by the user, those changes can be compared to the integration data to determine if they are outside of some threshold that possibly could damage the robot 12, limit the operation of the robot 12, etc. as analyzed, for example, by the control system. In other words, the control system can analyze changes made to the robot 12 and determine if those changes are acceptable, and the changes can be verified so that the user ensures that they are good. Also, the integration data can be downloaded to the robot controller 16 at any time to restore it to its original configuration.

Figure 3:
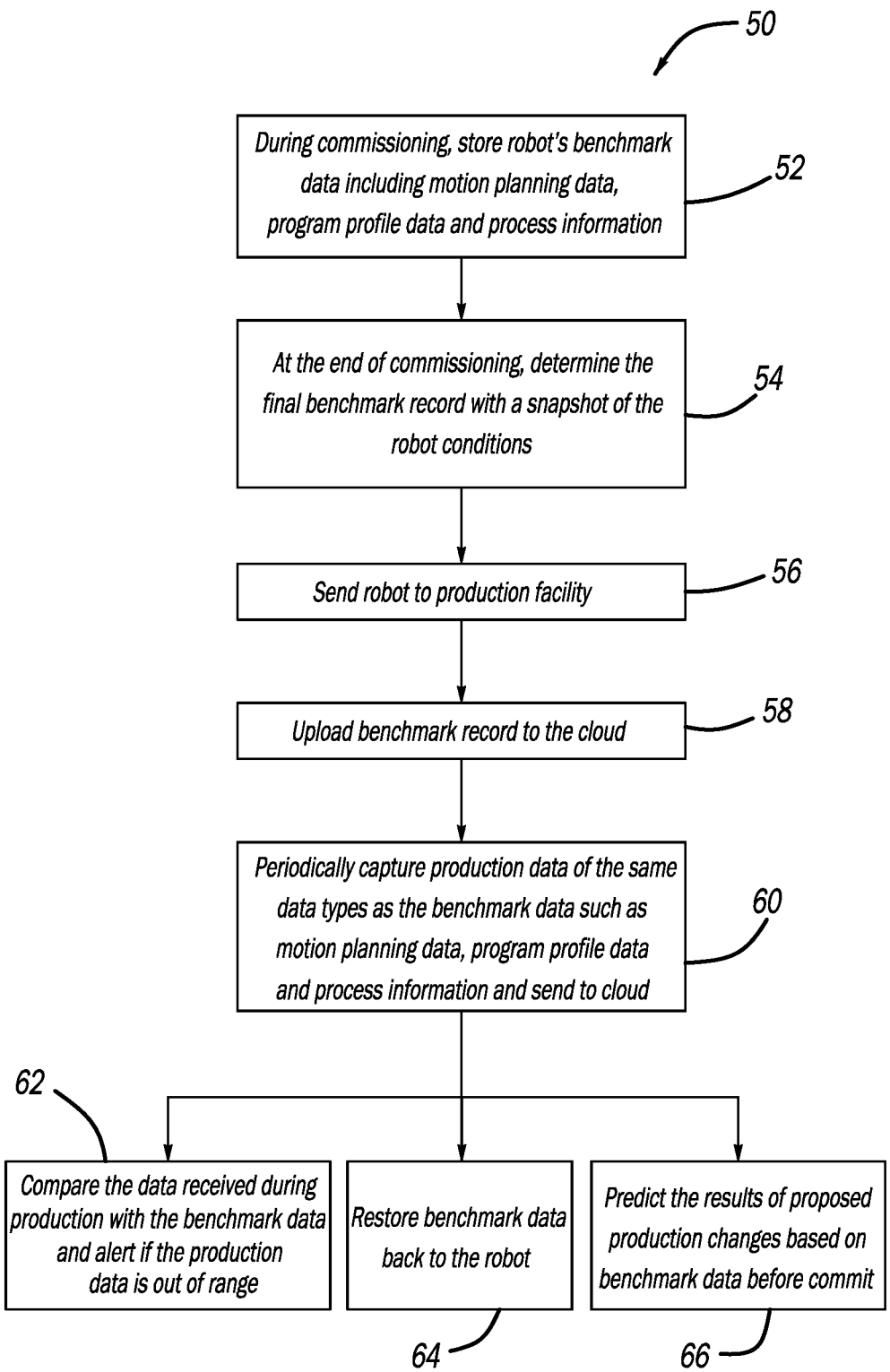
FIG. 3 is a flow chart diagram showing a process for storing benchmark data in the Cloud for robot operation obtained from the integrator when the robot system first arrives at the production facility, storing production data in the Cloud during operation of the robot in the production facility and comparing the benchmark data and production data provided by the Cloud in a control system.

FIG. 3 is a flow chart diagram 50 showing a process for monitoring the robot 12 in the manner discussed above. At box 52, the robot 12 has been commissioned and is at the integration site 10, where the robot's benchmark data including, for example, motion planning data, program profile data and process information are being stored in the robot controller 16. At the end of the commissioning process at box 54, the final benchmark record is determined with a snapshot of the robot's conditions that is stored in the robot controller 16. The robot 12 is then sent to the factory 22 at box 56, and at box 58 the benchmark record is uploaded to the data center 36 from the robot controller 16. The benchmark record can also be uploaded to the data center 36 before the robot 12 is sent to or installed in the factory 22. At box 60, during operation of the robot 12 in the factory 22, production data, or data of the configuration and operation of the robot 12 when it is in use, from the robot 12 is periodically uploaded to the data center 36, such as daily, that also includes motion planning data, program profile data and process information. The benchmark record and the production data are periodically compared and analyzed by the control system, including comparing the data received during production with the benchmark data and issuing an alert to the user if the data is outside of some predetermined range at box 62, restoring the benchmark data back in the robot controller 16 at box 64 and predicting the results of proposed production changes to the robot 12 based on the benchmark data before operating the robot 12 with new production data at box 66. The operation at the box 66 also includes determining whether the integration data is acceptable when it is uploaded to the data center 36.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for monitoring an industrial robot, said method comprising:
configuring the robot to perform a certain task during an integration process;
storing integration data in the robot identifying the configuration of the robot for performing the task;
installing the robot in a manufacturing facility after the integration data is stored in the robot; and
uploading the stored integration data to the Cloud when the robot is installed in the manufacturing facility.

2. The method according to claim 1 further comprising capturing production data generated by the robot during operation of the robot in the manufacturing facility and periodically uploading the production data to the Cloud.

3. The method according to claim 2 wherein the integration data and the production data include motion planning data, program profile data and process information.

4. The method according to claim 2 further comprising comparing the production data and the integration data and providing an alert if differences between the production data and the integration data exceed or approach a predetermined threshold.

5. The method according to claim 2 further comprising predicting the results of proposed production changes to the robot based on the integration data.

6. The method according to claim 2 wherein the integration data and the production data are analyzed by a control system.

7. The method according to claim 1 further comprising determining whether the integration data is acceptable for robot operation when it is uploaded to the Cloud.

8. The method according to claim 1 further comprising restoring the integration data to the robot.

9. The method according to claim 4 further comprising connecting the robot to a control system and operating the control system to capture the production data sets, perform the comparing step and performing the alerting step.

10. A method for monitoring an industrial robot, said method comprising:
   configuring the robot to perform a certain task during an integration process;
   storing integration data in the robot identifying the configuration of the robot for performing the task;
   uploading the stored integration data to the Cloud;
   installing the robot in a manufacturing facility;
   capturing production data generated by the robot during operation of the robot in the manufacturing facility and periodically uploading the production data to the Cloud; and
   comparing the production data and the integration data and providing an alert if differences between the production data and the integration data exceed or approach a predetermined threshold.

11. The method according to claim 10 wherein uploading the stored integration data to the Cloud occurs after the robot is installed in the manufacturing facility.

12. The method according to claim 10 wherein uploading the stored integration data to the Cloud occurs before the robot is installed in the manufacturing facility.

13. A system for monitoring an industrial robot, said system comprising:
   means for configuring the robot to perform a certain task during an integration process;
   means for storing integration data in the robot identifying the configuration of the robot for performing the task;
   means for installing the robot in a manufacturing facility after the integration data is stored in the robot; and
   means for uploading the stored integration data to the Cloud when the robot is installed in the manufacturing facility.

14. The system according to claim 13 further comprising means for capturing production data generated by the robot during operation of the robot in the manufacturing facility and periodically uploading the production data to the Cloud.

15. The system according to claim 14 further comprising means for comparing the production data and the integration data and providing an alert if differences between the production data and the integration data exceed or approach a predetermined threshold.

16. The system according to claim 14 further comprising means for predicting the results of proposed production changes to the robot based on the integration data.

* * * * *